(12) United States Patent
Roux

(10) Patent No.: US 10,436,627 B2
(45) Date of Patent: Oct. 8, 2019

(54) OIL LEVEL SENSOR

(71) Applicant: Safran Aircraft Engines, Paris (FR)

(72) Inventor: Eloïse Pauline Roux, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 0 days.

(21) Appl. No.: 15/577,235

(22) PCT Filed: May 27, 2016

(86) PCT No.: PCT/FR2016/051269
§ 371 (c)(1),
(2) Date: Nov. 27, 2017

(87) PCT Pub. No.: WO2016/193593
PCT Pub. Date: Dec. 8, 2016

(65) Prior Publication Data
US 2018/0156654 A1 Jun. 7, 2018

(30) Foreign Application Priority Data
May 29, 2015 (FR) ...................................... 15 54919

(51) Int. Cl.
*G01F 23/72* (2006.01)
*F01D 17/02* (2006.01)
*H01H 36/02* (2006.01)

(52) U.S. Cl.
CPC ............. *G01F 23/72* (2013.01); *F01D 17/02* (2013.01); *H01H 36/02* (2013.01)

(58) Field of Classification Search
CPC .......... G01F 23/30; G01F 23/64; G01F 23/72; G01F 23/74; H01H 36/02
USPC ............................... 73/290 R, 305, 313, 314
See application file for complete search history.

(56) References Cited

U.S. PATENT DOCUMENTS

| | | | |
|---|---|---|---|
| 3,433,073 A * | 3/1969 | Kunert ................... | G01F 23/68 338/33 |
| 4,976,146 A | 12/1990 | Senghaas et al. | |
| 6,481,278 B1 | 11/2002 | Kaylor et al. | |
| 6,679,286 B2 | 1/2004 | Kato et al. | |
| 2011/0012592 A1* | 1/2011 | Paradise ................. | G01F 23/68 324/207.16 |
| 2012/0324996 A1* | 12/2012 | Taylor ..................... | G01F 23/72 73/313 |
| 2013/0160871 A1 | 6/2013 | Mawhinney et al. | |

FOREIGN PATENT DOCUMENTS

DE 199 49 096 A1 4/2001
WO WO 2007/106964 A1 9/2007

* cited by examiner

*Primary Examiner* — Benjamin R Schmitt
(74) *Attorney, Agent, or Firm* — Blank Rome LLP

(57) ABSTRACT

The oil level sensor is associated with a tank containing oil and has a float movable along guides and which can float on the oil of the tank, so as to move with the oil level, a permanent magnet movable with the float, and an electronic card provided with magnetic switches sensitive to said magnet. The guides of the spherical float are positioned about the float and the contacts of the guides with said float are limited to three substantially linear zones.

10 Claims, 2 Drawing Sheets

OIL LEVEL SENSOR

CROSS-REFERENCE TO RELATED APPLICATIONS

This application is a national stage of International Application No. PCT/FR2016/051269, filed on May 27, 2016, which claims the benefit of French Patent Application 1554919, filed May 29, 2015, the contents of each of which are incorporated herein by reference.

TECHNICAL FIELD

The invention relates to a liquid level sensor, in particular oil, (otherwise known as OLS—Oil Level Sensor—), for gas turbine engines for aircrafts, associated with a tank containing the fluid, the level of which is desired to be detected.

BACKGROUND

The document U.S. Pat. No. 6,679,286 discloses an assembly comprising:
  a tank containing a liquid, such as oil,
  and a level sensor of such liquid, comprising:
    a float movable along guide means and which can float on the liquid of the tank or on a volume of the liquid in communication with the liquid in the tank, according to the principle of communicating vessels, so that the float can move along with the liquid level in the tank,
    at least one permanent magnet movable with the float,
    an electronic card provided with magnetic switches sensitive to said magnet.

One problem raised by this system is that, in the event of off-centering over the length of the guide means, the compensation of coaxiality tolerances relative to the upper centering may be provided by the liquid level sensor which supports the stress resulting from the misalignment by deforming. This deformation may weaken the sensor and result in the breaking thereof.

Reinforcing the sensitive areas of the sensor may then be required. Such reinforcement, however, increases the mass of the sensor, which affects the tank design (mechanical behaviour) and therefore the engine consumption. And this problem is even more important when the tank is rigidly mounted on the engine (no shock damper). The vibrations experienced by the sensor are then higher, thus causing more constraints in the sensor.

Another problem relates to the risks of the float getting stuck along its guide means.

As a matter of fact, some clearance is left between the float and the tube so that the float can slide along the guide means (a tube in U.S. Pat. No. 6,679,286). Now, if the float gets stuck by becoming askew along the tube, the oil level information provided by the sensor is then invalid because the float no longer follows the change in height of the oil remaining in the tank.

SUMMARY

An object of the present invention is to provide a solution to the above issues, and to ensure a reliable operation, with controlled mass and mechanical stress.

For this purpose, the invention provides that the guide means of the float should be positioned about the float and the contacts thereof with said float be limited to three substantially linear zones.

Thus, mounting will be isostatic.

In order to combine an easy production with an efficient guiding, it is recommended that the three contact zones should be defined, for the guide means, by three rails with substantially linear contacts (or supports).

And in order to separate the functions and make the operation safe again, here of the electronic card provided with magnetic switches, it is recommended that this electronic card should be located laterally away from the volume enclosed by said three substantially linear contact areas.

Moreover, to secure the quality of the level statement, the float will preferably be so dimensioned that the center of the built-in magnet is at the free surface of the oil or, in other words, that the permanent magnet is located at the center of the float.

It should also be noted that the aim is a further integration of the above-mentioned components together and stress limitation in case of misalignment between the tank and the axis of movement of the float. One objective is also to secure the operation of the electronic card, again by limiting the mechanical stresses it may have to absorb, and to limit the support of the float/guide means/electronic card assembly to one single holding area relative to the tank (a priori at an upper aperture or at the location of an orifice going through an upper wall of such tank) and thus to gain mass.

To approach some or all of these purposes, it is particularly proposed that said three contact regions should be linearly elongated in a curved profile and that the electronic card, held along said guide means, should be elongated substantially along said profile.

And, especially to enable an adaptation to a tank and/or guide means having curved or curvilinear section(s), the electronic card provided with magnetic switches responsive to said magnet is provided to be flexible.

As for the adaptation of profiles, it is recommended that:
a) the tank should extend along a curved profile, along which said three contact zones substantially and linearly extend, and that the guide means with said three contact zones, the float and the electronic card should be positioned in the tank, within a space which communicates with the tank through orifices for the fluid to circulate.
b) a tube should be provided outside the tank, connected therewith and communicating therewith for the liquid to circulate, with the external tube containing the guide means with said three contact zones, the float and the electronic card, with the tank extending along a curved profile along which substantially and linearly extend said three contact zones and the guide means with said three contact zones,
c) or still, in conjunction with solution b), that the tank should have a longitudinal embedding recess wherein the outer tube will be positioned.

BRIEF DESCRIPTION OF THE DRAWINGS

The invention will be better understood, and other details, characteristics and advantages of the invention will appear even more clearly upon reading the following description given by way of a non restrictive example while referring to the appended drawings wherein:

FIG. 1 shows a functional assembly 1, comprising a tank 3 containing a liquid, here oil 5, and an oil level sensor 7 intended to detect the level 50 of oil in the tank.

Figure 1:
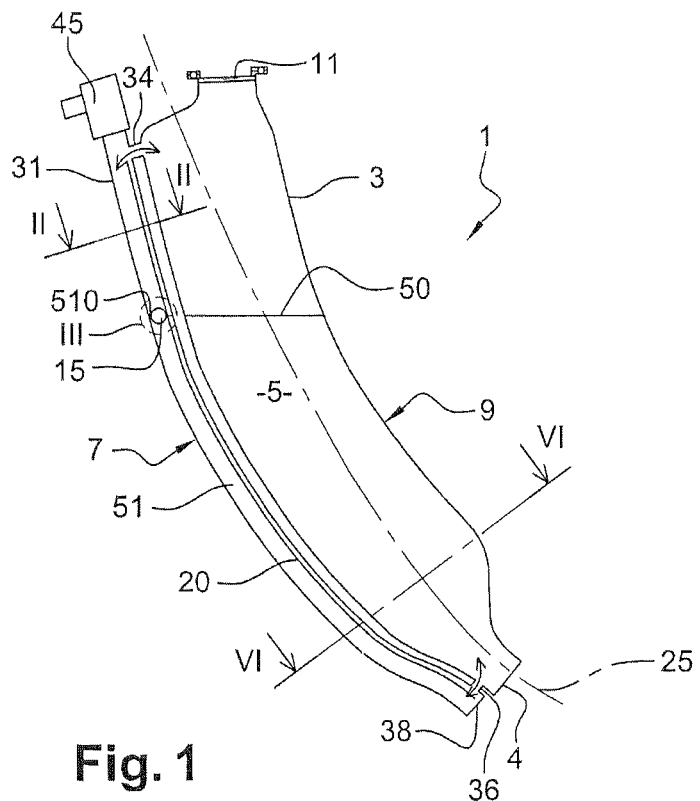
FIGS. 1 and 5 schematize an oil tank and sensor assembly, according to two possible interesting embodiments.

The closed-bottom 4 tank 3 is an elongated part belonging to an enclosure 9 which has, at the top thereof, an opening 11 enabling the oil to return to the tank. Another opening, not shown, is used for manually filling the tank 3.

Attachment lugs (not shown) enable a rigid attachment of the tank 3 to a structural stationary part of the concerned aircraft engine.

The sensor (7) comprises:
- a float 15 movable along guide means 17 (refer to FIGS. 2, 3) and which can float on a volume of fluid 51 (free surface 510) in communication with the oil 5 in the tank, according to the principle of communicating vessels, so that the float can move with the oil level in the tank,
- at least one permanent magnet 19 movable with the float,
- and an electronic card 20 provided with magnetic switches, or reed switches 21a, 21b . . . 21o (FIG. 4) sensitive to the magnetism of the magnet 19.

In the favorite example, the float is spherical. The shape thereof does not however impact the quality of information, so long as the magnet 19 can close the electronic card 20 switches or commutators. The float 15 could thus be mounted in a linear or roller bearing for instance. In other words, the float 15 will advantageously have a convex outer surface.

Figure 4:
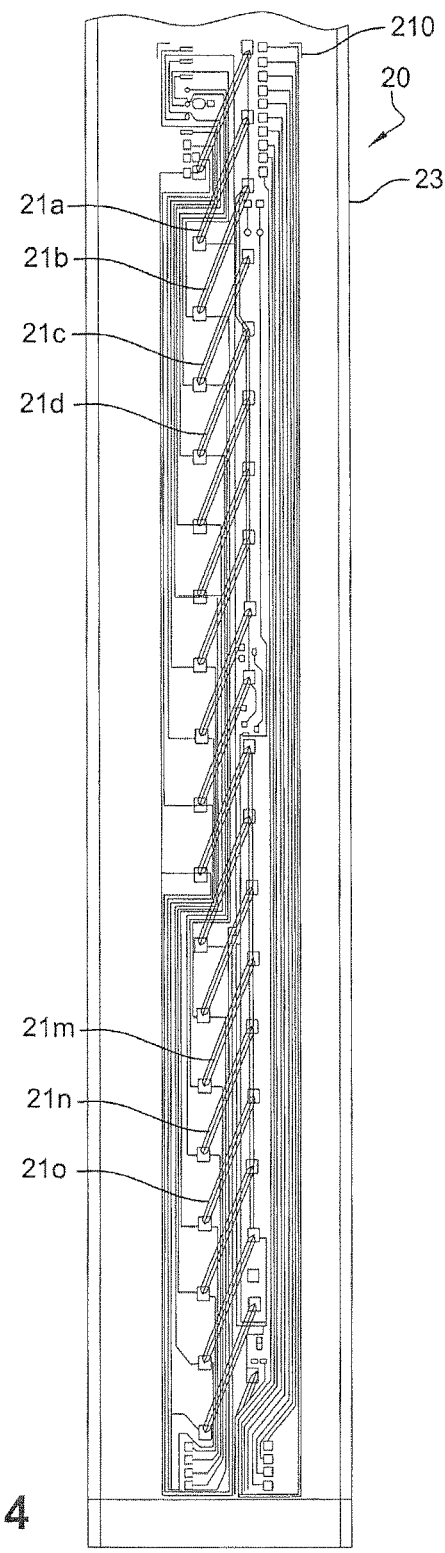
FIG. 4 is an elevation diagram of an electronic card adapted to the invention, in the other Figures.

The operation principle of the electronic card 20, with its magnetic switches 21a, 21b . . . 21o (FIG. 4) which interact with the magnet 19 is known. This is not the object of the invention. FIG. 4 (extracted from the document U.S. Pat. No. 4,976,146) thus schematizes one exemplary embodiment only, with a printed circuit card 210 which is positioned on a plurality of generally spaced reed switches bearing reference number 21 and which comprises individual switches 21a and al. A non-magnetic conduit 23, made of PVC or glass fiber, surrounds and protects the circuit card 210 and the switches 21 from the surrounding liquid.

The electronic card 20 is elongated and positioned with the switches 21 to thus extend along the path that can be followed by the float 15, according to the oil level.

An appropriate electric connection is established between the printed circuit card 210 and the reed switches matrix 21 for connection with an information device (such as a display, not shown), which can indicate the vertical position of the float 15 relative to the switches 21. When the liquid level 50 changes, the one 510 thus also changes and the float 15 moves relative to the switches 21, thus providing the display of the liquid level 50. As is conventional, the reed switches 21 may consist of first and second conductors which, when exposed to the same pole of an external magnetic field, are repelled by then closing the passage of the current, whereas, when the wires are exposed to opposite poles of such magnetism, the external wires are attracted to each other and close the switch.

Figure 2:
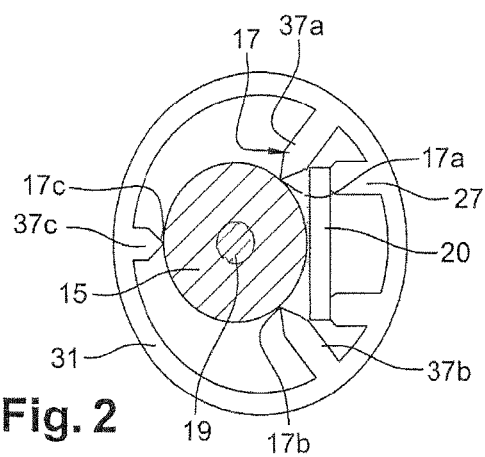
FIGS. 2 and 3 are two diagrams, respectively in transversal section II-II and in axial section (area III in FIG. 1)
Figure 3:
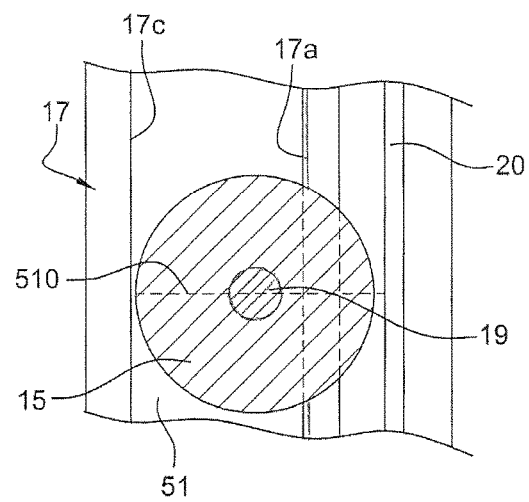

Regardless of the way the card 20 is provided and of the wireless communication to be established between the magnet 19 of the float and the switches 21, a remarkable characteristic lies in that the means 17 for guiding the spherical float 15 is arranged around the float and contacts said float, or supports, within three substantially linear regions bearing reference 17a, 17b, 17c in FIG. 2; see also FIG. 3.

An isostatic guiding will thus be provided and the mounting of the above solution will thus be adapted in tanks 3, 33, 43 (FIGS. 1, 5, 6) having a curved or curvilinear and not only rectilinear general longitudinal profile (25 in FIGS. 1, 6; 35 in FIG. 5), like the one in U.S. Pat. No. 6,679,286. It should be understood that the general longitudinal profile is the general line which the float moves along, and thus substantially along which the circuit board 210 and the switches 21 must longitudinally extend.

The three areas 17a, 17b, 17c are substantially linear so long as they define their contacts with the sphere 15 generally along lines (or surfaces with a low thickness, of the order of mm, for example). Moreover, FIG. 2 shows that the free ends of the three contact areas 17a, 17b, 17c can each define a peak or a tapered portion.

The views of FIGS. 2 and 3 show that the three contact zones 17a, 17b, 17c will thus advantageously be defined by three elongated rails thus in substantially linear contact with the outer surface of the sphere 15. The extension will follow the profile considered, such as 25 or 35.

The electronic card 20 attached to the support 27, is right in front of the sphere 15.

Specifically, the electronic card provided with the magnetic switches 21 is located laterally relative to the direction of extension 25 or 35, away from (around) the volume enclosed by said three contact areas.

Thus, the free guided sliding of the float 15, and thus the quality and reliability of measurements will be optimally efficient and even more so if, as shown, the permanent magnet 19 is located at the center of the spherical float, with a single such magnet being insufficient.

As already mentioned, the magnet 19 may in particular be spherical; and the float may be solid, so that its material can keep the magnet centered. Considering that the float 15 will generally have an advantageously convex outer surface, a magnet centered behind such a surface, which can rotate without off-centering the magnet, will be advantageous for the desired effect.

In the solution of FIG. 1, a tube 31 outside the tank 3 and connected thereto communicates with the tank for the circulation of oil.

In the example, two communication orifices 34, 36 are provided here respectively towards the top and the lower closed bottom 38 of the tube 31.

The principle of communicating vessels for oil is provided by the lower orifice 36. If the tube 31 is rigid enough, the behaviour and mechanical connection thereof with the tank 3 can be provided by the two short transverse tubes with holes 34, 36 only.

The three arms 37a, 37b, 37c, linearly elongated along the curved profile, such as 25 or 35, each carrying a contact zone will individually protrude inward the tube 31. They are distributed at 120° from each other around the spherical float 15.

The electronic board 20 will be held along such means, between two arms, by its support(s) 27, for example by gluing, and will also extend substantially along said profile.

For this purpose, two options are provided: the card is rigid, for instance made of polyimide, but has been preformed to fit the appropriate curved or curvilinear profile, or the electronic card 20 provided with the magnetic switches sensitive to said magnet is flexible, for example graphene-based.

Figure 5:
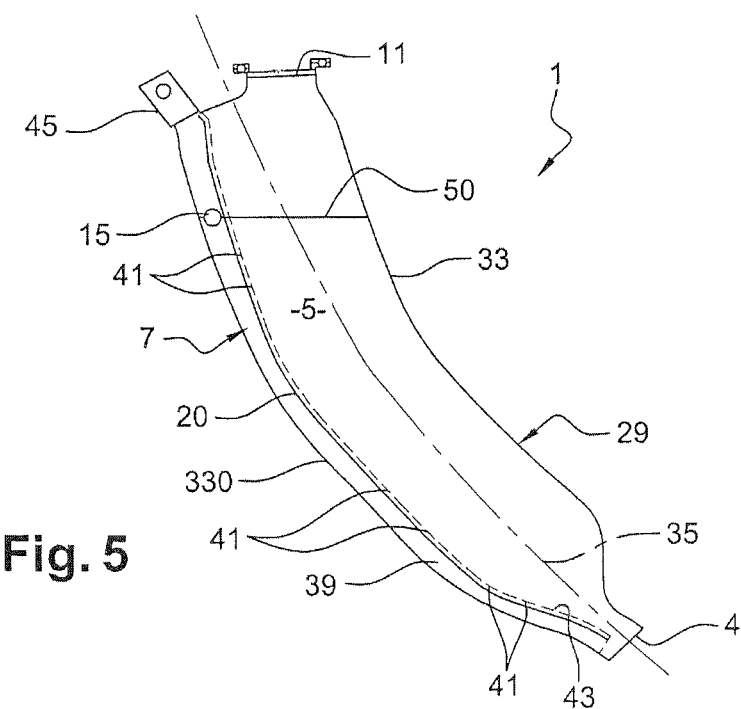

When compared to the embodiment shown in FIG. 1, the one of FIG. 5 shows the following differences: the guide means, with said three contact zones, the spherical float 15 and the electronic card 20 are positioned in the tank 33, within a space 39, which communicates with the tank 33 through orifices 41, an element of the enclosure 29, for the circulation of oil. The enclosure 29 is different from the enclosure 9 in that the sensor 7, which used to be positioned outside along the tank 3 FIG. 1 is now built in the tank 33.

The orifices 41 can be formed, along the card 20, in a tubular wall 43 locally closed by a solid area 330 of the tank 33. The three longitudinally positioned arms 37*a*, 37*b*, 37*c* in FIG. 2 will then protrude inwards, some from the tubular wall 43, and another one from the area 330. Supports such as lugs 27 can hold the card 20 along the tubular wall 43 which will then be positioned longitudinally and as shown, substantially in conformance with the profile 35, as was the general shape of the tube 31 conforming with the profile 25.

FIGS. 1 and 5, it can further be noted that, at the top of the tank, the sensor 7, and more particularly the card 20, is connected with a connector 45 through which the oil level information detected by the magnetic switch device 21 can be sent to the appropriate processing system of the aircraft engine.

Figure 6:
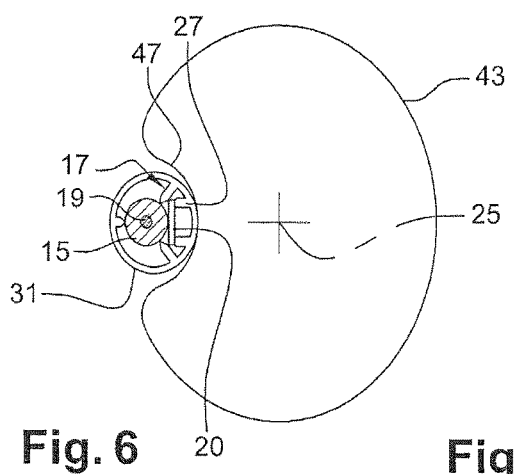
FIG. 6 is a diagram along the VI-VI transversal section.

Referring now to FIG. 6: in this embodiment, the tank, having reference number 43, has a longitudinal embedding recess 47, wherein the external tube 31 is positioned, which is different from the tank 3. The recess 47 extends along the profile 25 and substantially has the shape thereof.

The fluidic communication and relative holding will again be obtained through the two transversal short nozzles respectively having the orifices 34, 36 (not shown in FIG. 6).

Such alternative embodiment makes it possible to limit the overall dimensions and to stiffen the tank.

As regards the advantages, the following can also be noted:
limitation, or even elimination, of some installation constraints, since the sensor conforms to the shape of the tank (no intermediate support is required in the tank any longer),
gain in mass via the elimination of such intermediate support and the frequent mechanical reinforcements in the sensor body, and the reduction in the number of guides for the spherical float (rails).

The invention can be applied to any type of level sensor mounted in a fluid tank.

The invention claimed is:

1. An assembly comprising:
a tank containing a liquid, and
a liquid level sensor comprising:
a float movable longitudinally, on a determined distance, along three guide means and which can float on the liquid of the tank or on a volume of the liquid in communication with the liquid in the tank, according to the principle of communicating vessels, so that the float can move with a liquid level in the tank;
at least one permanent magnet movable with the float; and
an electronic card provided with magnetic switches sensitive to said permanent magnet; wherein:
the three guide means of the float are positioned about the float;
the float is spherical;
the permanent magnet is positioned at the center of the float;
each guide means has a free end which is in contact with the that through a linear contact zone, so that three substantially linear contact zones are defined; and
the electronics card is positioned between two of the three guide means, laterally away from a volume limited by said three substantially linear contact zones, and extends longitudinally on the determined distance along which the float is movable longitudinally.

2. The assembly according to claim 1, wherein the three substantially linear contact zones are defined, for the guide means, by three longitudinal rails having substantially linear contacts.

3. The assembly according to claim 1, wherein said three substantially linear contact zones longitudinally extend along a curved profile, and the electronic card, held along said guide means, substantially extends along said curved profile.

4. The assembly according to claim 1, wherein the electronic card provided with the magnetic switches sensitive to said permanent magnet is flexible.

5. The assembly according to claim 1, wherein the tank extends along a curved profile, along which said three substantially linear contact zones extend, and the guide means with said three substantially linear contact zones, the float, and the electronic card are positioned in the tank, within a space which communicates with the tank through orifices for the liquid to circulate.

6. The assembly according to claim 1, further comprising a tube outside the tank, connected therewith and which communicates therewith for the liquid to circulate, with the tube containing the guide means with said three substantially linear contact zones, the float, and the electronic card, the tank further extending along a curved profile along which said three substantially linear contact zones and the guide means with said three substantially linear contact zones extend.

7. The assembly according to claim 6, wherein he tank has a longitudinal embedding recess in which the tube is positioned.

8. A turbine: engine comprising the assembly according to claim 1.

9. An assembly comprising:
a tank containing a liquid, and
a liquid level sensor comprising:
a float movable longitudinally, on a determined distance, along three guide means and which can float on the liquid of the tank or on a volume of the liquid in communication with the liquid in the tank, according to the principle of communicating vessels, so that the float can move with a liquid level in the tank;
at least one permanent magnet movable with the float; and
an electronic card provided with magnetic switches sensitive to said permanent magnet;
wherein:
the three guide means of the float are positioned about the float;
the float is spherical;
the permanent magnet is positioned at the center of the float;
each guide means has a tip which is in contact with the float through a linear contact zone, so that three substantially contact zones are defined: and
the electronics card is positioned between two of the guide means, laterally away from a volume limited by said three substantially linear contact zones, and extends longitudinally on the determined distance along which the float is movable longitudinally.

10. The assembly according to claim 9, wherein the tip of each guide means is located at one of a tapered portion of the guide means and a peak of the guide means.

* * * * *